United States Patent [19]
Acampora et al.

[11] Patent Number: 5,729,292
[45] Date of Patent: Mar. 17, 1998

[54] OPTIMIZING PERFORMANCE IN A PACKET SLOT PRIORITY PACKET TRANSPORT SYSTEM

[75] Inventors: Alfonse Anthony Acampora, Staten Island, N.Y.; Richard Michael Bunting, Hamilton Square, N.J.; Steven Kennedy Evans, Holland, Pa.; Paul Wallace Lyons, New Egypt, N.J.; Nicola John Fedele, Kingston, N.J.; Victor Vincent D'Alessandro, Berkeley Heights, N.J.

[73] Assignee: Thomson Multimedia, S.A., Boulogne, France

[21] Appl. No.: 576,527

[22] Filed: Dec. 21, 1995

[51] Int. Cl.⁶ ........................................ H04N 7/12
[52] U.S. Cl. .................. 348/390; 370/469; 370/473
[58] Field of Search .......................... 348/387, 385, 348/7, 12, 13, 390, 426, 423, 461, 466; 370/469, 473, 486, 493, 487, 474

[56] References Cited

U.S. PATENT DOCUMENTS

| | | | |
|---|---|---|---|
| 5,111,292 | 5/1992 | Kuriacose et al. | 358/133 |
| 5,115,309 | 5/1992 | Hang | 358/133 |
| 5,271,009 | 12/1993 | Takano et al. | 370/94.7 |
| 5,365,272 | 11/1994 | Siracusa | 348/426 |
| 5,455,629 | 10/1995 | Sun et al. | 348/466 |
| 5,467,342 | 11/1995 | Logston et al. | 370/17 |
| 5,504,823 | 4/1996 | Yoon | 382/233 |
| 5,510,844 | 4/1996 | Cash et al. | 348/465 |
| 5,517,250 | 5/1996 | Hoogenboom et al. | 348/467 |
| 5,524,001 | 6/1996 | Beaudry et al. | 370/73 |
| 5,537,408 | 7/1996 | Branstad et al. | 370/79 |
| 5,563,648 | 10/1996 | Menand et al. | 348/7 |
| 5,568,274 | 10/1996 | Fujinami et al. | 348/390 |
| 5,574,505 | 11/1996 | Lyons et al. | 348/426 |
| 5,583,859 | 12/1996 | Feldmeier | 370/471 |
| 5,612,742 | 3/1997 | Krause et al. | 348/385 |
| 5,621,463 | 4/1997 | Lyons et al. | 348/387 |

*Primary Examiner*—Victor R. Kostak
*Attorney, Agent, or Firm*—Joseph S. Tripoli; Eric P. Herrmann; Ronald H. Kurdyla

[57] ABSTRACT

A method is disclosed for optimizing the operation of a packet transport system generating a packet stream carrying a plurality of component signals, and includes the following steps. First the packet stream is partitioned into successive groups, each group containing a predetermined number of packet slots. A plurality of lists are maintained, one associated with each packet slot in a group. A packet stream is generated by placing data representing a component signal selected in response to entries in the list associated with that packet slot into the packet slot. The contents of the plurality of lists are updated based on a predetermined parameter.

14 Claims, 2 Drawing Sheets

OPTIMIZING PERFORMANCE IN A PACKET SLOT PRIORITY PACKET TRANSPORT SYSTEM

The present invention relates to a method for optimizing the performance of a packet slot priority packet transport system. In particular this method adaptively changes the assignment of the various component packet streams to packet slots in a composite packet stream.

In U.S. patent application Ser. No. 08/442,429, entitled A METHOD AND APPARATUS FOR OPERATING A TRANSPORT STREAM ENCODER TO PRODUCE A STREAM OF PACKETS CARRYING DATA REPRESENTING A PLURALITY OF COMPONENT SIGNALS, and filed May 16,1995 by Lyons et al., incorporated by reference, a transport packet stream encoder is described in which a composite packet stream produced by the transport stream encoder is partitioned into successive groups of packet slots. Each packet slot in a group has associated with it a priority ordered list of acceptable component signals, the data from a selected one of which may be placed in that packet slot. When a packet is to be formed, the priority list associated with that packet slot is traversed in priority order, and the first component signal source which has enough data waiting to be transmitted to fill a packet is assigned to fill that packet slot. If none of the component signal sources in the priority list have enough data, then a null packet is produced in that packet slot. The priority lists are generated in such a manner as to provide the level of throughput which the providers of the component signals have purchased from the transport provider.

As stated in that application, this arrangement gives the flexibility to assign a high priority to low data rate components, and a low priority to high data rate components in a packet slot. This permits low data rate signals sufficient access to packet slots to maintain their required throughput, while allowing those slots to be filled by high data rate component data if the low data rate component does not have sufficient data available to fill a packet, and thus avoid the generation of a wasteful null packet.

In that system, the transport system provider is expected to either provide the purchased throughput to the component signal provider, or to a priori project the throughput required by each component, and allocate sufficient packet slots to that component to provide the required throughput. In addition, the transport system provider is expected to properly predict an appropriate allocation of the component signals to the priority lists associated with each packet slot in order to minimize the number of null packets which might be produced in operation, while maintaining the required throughput of the component signals.

In any such packet transport system, carrying many components, the throughput required by some of the components varies dynamically. For example, considering a video component, it is well understood that a basketball game, with its practically unceasing motion, requires a relatively high throughput to transmit without distortion. However, even during the basketball game, there are times when the relatively high throughput purchased to broadcast that game is not required. For example, a half-time show, which includes only an interviewer and a guest sitting quietly in chairs in front of a non-changing background, requires a relatively low throughput to transmit without distortion. A channel which is broadcasting a basketball game, including such a half-time show, will see a large difference in the required instantaneous throughput from the game segment of the broadcast, to the interview segment.

The same can occur when programming changes on a scheduled basis, such as on the hour and half-hour, when a program may change from a basketball game to a news broadcast at a predetermined time. A transport system is desirable which can allocate many relatively high priority packet slots to a component during a relatively high throughput period, then yield those high priority slots to other components during a relatively low throughput period.

In accordance with principles of the present invention, a method for optimizing the operation of a packet transport system generating a packet stream carrying a plurality of component signals includes the following steps. First, the packet stream is partitioned into successive groups, each group containing a predetermined number of packet slots. A plurality of lists are maintained, one associated with each packet slot in a group. Each list contains a plurality of entries containing identification data related to a respective one of the component signal sources. A packet stream is generated by placing data from a component signal source into a packet slot. A component signal source is selected in response to component signal source identification data in the entries in the list associated with that packet slot. The contents of the plurality of lists are then updated based on a predetermined parameter.

The operation of such a transport stream encoder may be optimized to the current state of the component signals in the packet stream. That is, a transport stream encoder operated according to this method can adapt its operation to changing throughput requirements of the various component signals due to scheduled changes in programming, and thus optimize its operation, e.g. providing the throughput required by each component while minimizing the number of null packets. In this embodiment, the predetermined parameter is the time. A clock may provide a signal to indicate when the programming has changed (such as at the hour and half-hour). When the clock signal is received, the plurality of lists are updated to optimally configure the packet transport system for the new mix of component signal sources, and their content.

In accordance with another aspect of the invention, the predetermined parameter may be based on the content of the packet stream. In such a transport stream encoder, each packet is analyzed to determine the identity of the component signal source whose data is contained in that packet, by a data collector responsive to the packet stream. The entries in the plurality of lists are updated in response to the gathered data, for example, to take advantage of a lull in the data rate of one component signal. In this case, the data in the plurality of lists are updated to decrease the priority of the component signal experiencing a lull, thereby increasing the priorities of the other component signals. In this manner, the operation of the transport stream encoder may be optimized to the instantaneous changes in the data rate of the component signal sources.

BRIEF DESCRIPTION OF THE DRAWINGS

In FIG. 1, a plurality of component signal sources (not shown) are coupled to respective corresponding input terminals 5. Input terminals 5 are coupled to respective data input terminals of a packet generator 10. An output terminal of the packet generator 10 is coupled to an output terminal 15 of the packet transport stream encoder. Output terminal 15 is coupled to further circuitry (not shown) which, for example, may transmit the signal produced by the packet generator 10 to a remote location.

Figure 1:
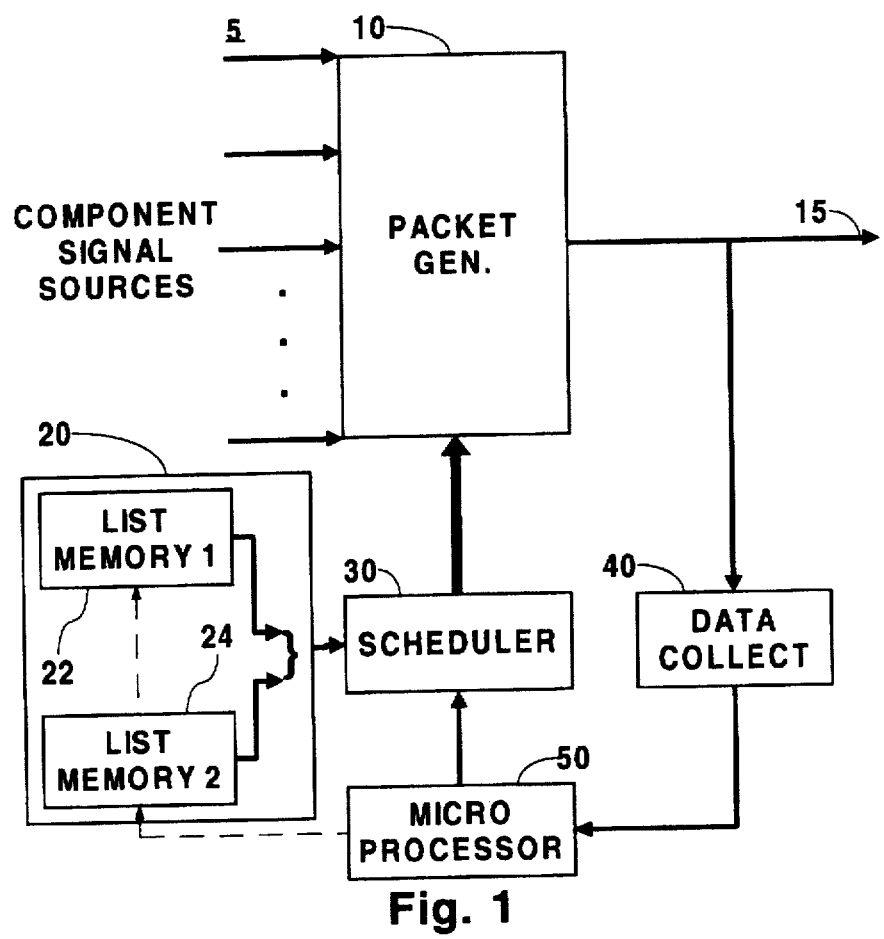
FIG. 1 is a block diagram of a transport stream encoder incorporating the present invention.

A schedule list memory 20, includes a first list memory (LIST MEMORY 1) 22, and a second list memory (LIST MEMORY 2) 24. An output terminal of the schedule list memory 20 is coupled to a schedule data input terminal of a scheduler 30. An output terminal of the scheduler 30 is coupled to a control input terminal of the packet generator 10. The output terminal of the packet generator 10 is also coupled to an input terminal of a data collector 40. An output terminal of the data collector 40 is coupled to an input terminal of a microprocessor 50. An output terminal of the microprocessor is coupled to a control input terminal of the scheduler 30.

In one embodiment of the packet transport stream encoder, the scheduler 30 operates as an independent subsystem under the control of the microprocessor 50. In this embodiment, data is written to or read from the list memories 22 and 24 in the schedule list memory 20, and received from or supplied to the microprocessor 50, by the scheduler 30. In an alternate embodiment, the scheduler 30 may be implemented as an I/O device attached to the system bus (not shown) of the microprocessor 50. In this embodiment, the schedule list memory 20 is also coupled to the system bus of the microprocessor 50, indicated in phantom by a signal line from the microprocessor 50 to the scheduler list memory 20. The microprocessor 50 may write data to or read data from the schedule list memory 20 directly through the system bus, and the scheduler 30 may access the schedule list memory 20 using known techniques such as direct memory access (DMA), for example.

Figure 2:
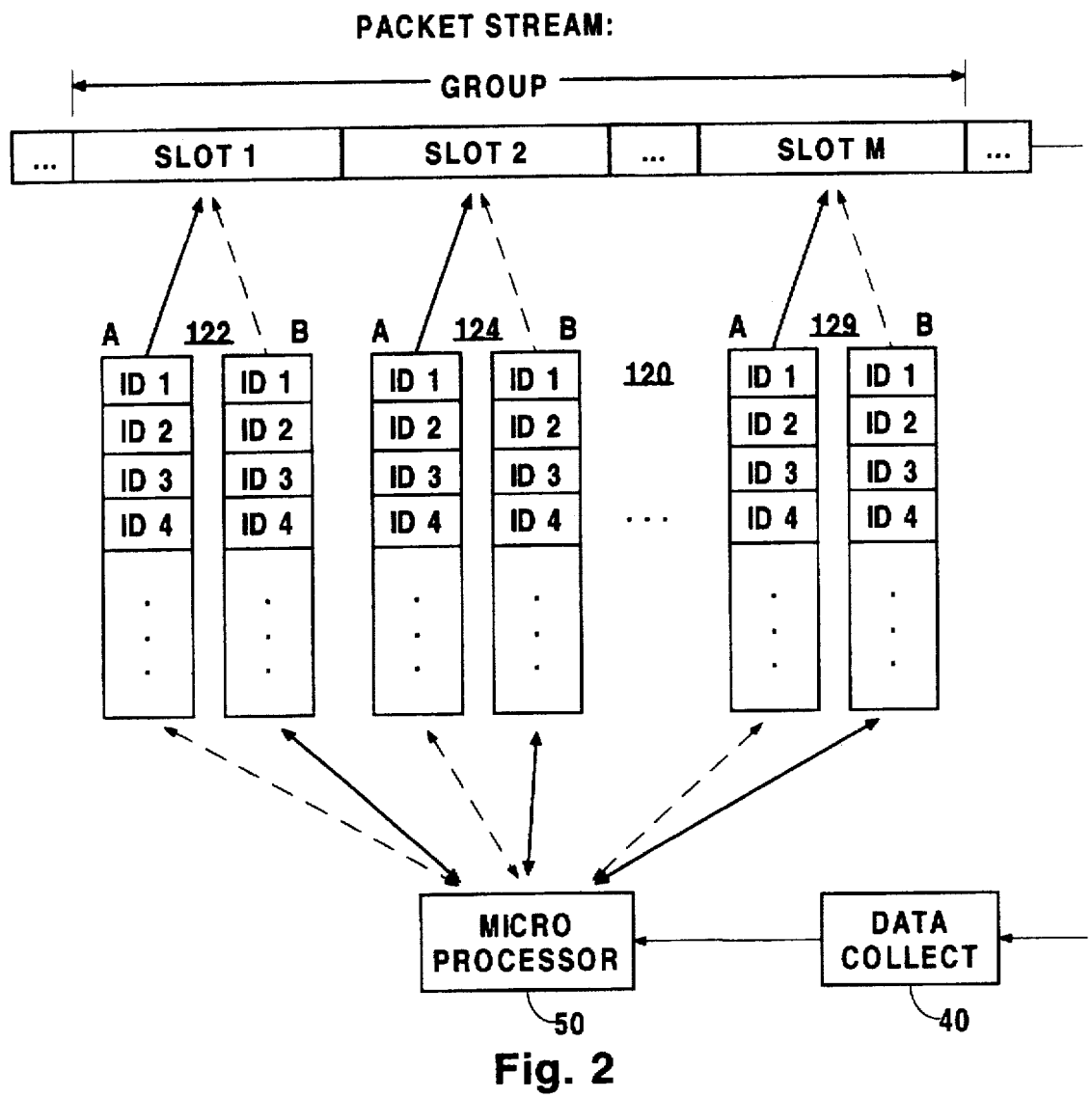
FIG. 2 is a diagram, partially in block diagram form, partially in memory layout form, and partially in waveform form useful in illustrating the operation of the transport stream encoder illustrated in FIG. 1.

FIG. 2 is a diagram useful in illustrating the operation of the transport stream encoder illustrated in FIG. 1. In operation, the packet generator 10 produces a packet stream containing a series of packets, each either containing data from one of the component data sources (of FIG. 1) or being a null packet containing no data. The packet stream is illustrated at the top of FIG. 2 as a series of rectangles. This packet stream is divided into successive groups, each group containing M packet slots. A single group of packet slots is illustrated in FIG. 2. The first packet slot in the group is labeled SLOT 1, the second is labeled SLOT 2, and the last is labeled SLOT M. The successive groups of packets repeat in the packet stream, so that the last packet slot before the group illustrated in FIG. 2 is SLOT M of the preceding group, and the next packet slot after the group illustrated is SLOT 1 of the succeeding group.

Each packet slot has associated with it a priority list. The schedule list memory 20 (of FIG. 1) contains the data making up these priority lists 120. A first set of priority lists, 122 A, 124 A ... 129 A, is stored in the first list memory 22 in the schedule list memory 20. In FIG. 2, SLOT 1 has associated with it the priority list 122 A, indicated by an arrow running from priority list 122 A to SLOT 1. Similarly, SLOT 2 has associated with it the priority list 124 A, and SLOT M has associated with it the priority list 129 A. Each priority list contains a plurality of entries stored in priority order. The number of entries in any list need not be the same as the number of entries in any other one of the lists. In FIG. 2, the topmost entry in each priority list is assigned the highest priority; the second entry is assigned the next highest priority, and so forth.

Each entry in the list contains an identifier of a component signal source (of FIG. 1). The component signal sources have respectively unique identifiers associated with them. The top entry ID1 in the priority list 122 A can be set to contain the identifier of any of the component signal sources; the second entry ID2 in the priority list 122 A can also contain the identifier of any of the component signal sources, and so forth. Similarly, all the entries IDx in the priority lists 122 A, 124 A and 129 A can contain the identifier of any of the component signal sources.

The packet generator 10 contains, in a known manner, a plurality of FIFO buffers (not shown), respectively coupled to the component signal sources. When a component signal source is being sought for SLOT 1, the scheduler 30 scans the priority list 122 A, associated with SLOT 1, from top to bottom. The FIFO associated with the component signal source identified by the first entry ID1 in the priority list 122 A is checked. If there is sufficient data in that FIFO to form a complete packet, then the scheduler 30 conditions the packet generator 10 to extract the data from that FIFO, and form a packet in SLOT 1 containing that data. If there is not sufficient data in that FIFO to form a complete packet, then the FIFO associated with the component signal source identified by the next entry ID2 in the priority list 122 A is checked. If there is sufficient data in that FIFO, the scheduler 30 conditions the packet generator 10 to form a packet containing that data, otherwise the FIFO from the next entry is checked.

This continues until either a FIFO associated with a component signal source identified by an entry in the priority list 122 A is found to contain sufficient data to form a packet; or no such FIFO is found, in which case the scheduler 30 conditions the packet generator 10 to produce a null packet. The above process is then repeated for SLOT 2, in which the priority list 124 A is scanned from top to bottom, and then, in succession, for every other packet slot in the group of packet slots, through to SLOT M, in which the priority list 129 A is scanned. The entire procedure then repeats for the succeeding group, starting again with the priority list 122 A.

As described above, this arrangement gives the system programmer the ability to assign to a low data rate signal component a high priority in a packet slot, thus giving it surer access to a packet slot, while assigning to a high data rate signal component a low priority in that packet slot, giving some assurance that, if the low data rate signal does not have sufficient data in its FIFO, at least a packet containing the high data rate signal component can be generated instead of a null packet.

In FIG. 2, a second set of priority lists, 122 B, 124 B ... 129 B are stored in the second list memory 24 in the schedule list memory 20. The second set of priority lists, 122 B, 124 B and 129 B, are associated with the microprocessor 50, as indicated by the arrows running between those priority lists and the microprocessor 50. These lists correspond in structure to the first set of priority lists 122 A, 124 A and 129 A, respectively. The microprocessor 50 can read and/or write component signal source identifiers into the entries of the second set of priority lists in such a manner as to adapt the contents of the packet slots. This may be done in response to the time, as for programming changes on the hour or half-hour, or in response to changed instantaneous throughput requirements as determined by the data collected by the data collector 40. When the second set of priority lists generated by the microprocessor 50 are complete, then the scheduler 30 (of FIG. 1) is conditioned by the microprocessor 50 to take its priority data from the second set of priority lists 122 B, 124 B and 129 B. This is indicated in phantom in FIG. 2 by dashed arrows from priority list 122 B to SLOT 1, priority list 124 B to SLOT 2 and priority list 129 B to SLOT M.

At the same time, the first set of priority lists 122 A, 124 A and 129 A become associated with the microprocessor 50, as indicated in phantom by the dashed arrows between the priority lists 122 A, 124 A and 129 A, and the microprocessor 50. In a similar manner to that described above, the microprocessor 50 now updates the entries in the first set of priority lists, 122 A, 124 A and 129 A, while the scheduler 30 is accessing the second set of priority lists 122 B, 124 B and 129 B.

In a first embodiment, the first and second list memories 22 and 24 are implemented as respective FIFO memories. Each entry in the FIFO memory contains both the identifier of a component signal source as described above, and a flag field. The first entry in the FIFO is the highest priority entry for the first slot SLOT 1. The flag field for this entry has a first value to indicate that it is a first entry for a packet slot. The next entry in the FIFO is the entry for the second priority component signal source for the first packet slot. The flag field for this entry is set to a second value to indicate that it is not the first entry for a packet slot. The next following entries in the FIFO are the remaining entries for the first packet slot arranged in priority order, all with flag fields having the second value. The next entry in the FIFO is the highest priority entry for the second packet slot with its flag field having the first value. The next following entries are the other entries for the second packet slot in priority order, all with the flag fields having the second value. The entries for the other packet slots follow in a similar format.

Alternatively, the flag field of the last entry for a packet slot may contain the first value as an indication that no more entries exist in the priority list for that packet slot. The flag fields for all other entries for the priority list contain the second value. More generally, the flag field containing the first value may be placed in any location in the priority list which permits the scheduler 30 to determine the boundaries between priority lists of adjacent packet slots.

When a new packet slot is to be filled, the scheduler 30, reads the next entry made available from the list memory FIFO, and checks the component signal source referenced in that entry, as described above. As the component signal FIFO for each entry is checked, the next entry from the list memory FIFO is read. This repeats until either a component signal source is found with sufficient data to form a packet, or the flag field in the list memory FIFO entry indicates that it is the first entry for the next packet slot; in which case a null packet is produced. When the packet slot is filled, the list memory FIFO entries are read until the first one for the next packet slot is found. Then the process repeats for the next packet slot. The output of the list memory FIFO is fed back to the input so that the entries continually recirculate. One skilled in the art of digital design will understand how to design and implement a FIFO to operate in this manner. While the list memory FIFO coupled to the scheduler 30 is operating in this manner, the microprocessor 50 is loading the other list memory FIFO with a new plurality of priority lists.

In an alternate embodiment, the first and second priority list memories 22 and 24 are stored in respective read/write memories (RAMs), or in separate areas of a single RAM. When the first packet slot is to be filled, the scheduler 30 addresses the RAM location in the first priority list 22 containing the first, highest priority, entry in the priority list associated with the first packet slot. As described above, this may be done using a known DMA technique, a dual ported memory, or any other known memory access technique. Again, the component signal source identified by the data in this entry is checked, and if its FIFO contains sufficient data to form a packet, that data is inserted into the packet slot. If not, the scheduler 30 accesses the location containing the second entry in that priority list, and so forth. There are many possible ways of keeping track of when the last entry in a priority list has been accessed. For example, each entry may contain a flag field, as described above with respect to the FIFO embodiment; or a separate table containing the first and last locations of each priority list may be maintained; or a location may be maintained for each priority list containing the number of entries in that list. One skilled in the art of digital system design will understand how to implement such a system. While the first list memory 22, containing the first plurality of priority lists, is being accessed by the scheduler 30, the microprocessor 50 can be writing data into the second list memory 24, containing the second plurality of priority lists. As described above, the microprocessor 50 may be coupled to the first and second list memories 22 and 24 via a system bus (not shown) and can write to the list memories 22 and 24 in a known manner.

The microprocessor 50 can control which of the list memories, 22 or 24, is processed by the scheduler 30, while updating the other. This may be done in response to a clock signal received from a known real time clock. For example, when the clock signal indicates an hour or half-hour time period, the microprocessor 50 may change the priority lists to new lists prepared for the new mix of component signals and their desired throughputs.

The data collector 40 gathers data about the composition of the composite packet stream generated by the packet generator 10, as described above. Each packet generated by the packet generator 10 contains identification data identifying the component signal source whose data is contained in that packet. The data collector 40 analyzes the packet stream to extract the component signal source identification data. For example, the data collector 40 may form a histogram of the number of packets containing data from each component signal source within a predetermined time period. Alternatively, the data collector 40 may maintain a long term average, running average, weighted average, or any other desired statistical measure of the throughput of the component signal sources in the generated packet stream. These statistics are supplied to the microprocessor 50. The microprocessor analyzes the statistics to determine the instantaneous data throughput from each of the component signal sources. If the data rate from a component signal source drops, then the identifier of that component signal source may be moved lower in its packet slot priority lists, or it may be removed entirely from some of its priority lists, if it is in more than one. This has the effect of increasing the priority of all the component signal sources which had previously been beneath it in their priority lists.

On the other hand, if the statistics indicate that the instantaneous data rate of a component signal source has increased, then the identifier of that component signal source may be moved up in its priority lists, or may be added to other priority lists. This has the effect of increasing the priority of that component signal source, and thus accommodating its increased instantaneous data rate.

What is claimed is:

1. A method for optimizing the operation of a transport stream encoder producing a stream of packets carrying data representing a plurality of component signals from more than one source, comprising the steps of:

partitioning the packet stream into successive groups containing a plurality of packet slots;

maintaining a plurality of lists, respectively associated with the plurality of packet slots, each list containing a plurality of entries, each entry containing data identifying a respective one of the plurality of component signals;

generating the packet stream in response to the entries in the plurality of lists; and modifying the plurality of lists based on a predetermined parameter.

2. The method of claim 1 wherein the list maintaining step comprises the step of maintaining a plurality of priority lists respectively associated with the plurality of packet slots.

3. The method of claim 1, wherein the predetermined parameter is time, and the modifying step comprises the step of modifying the plurality of lists in response to a prescheduled change in the component signal sources.

4. The method of claim 1, wherein the predetermined parameter is the contents of the packet stream:

further comprising the step of collecting data concerning the packet stream; and wherein:

the modifying step comprises the step of modifying the plurality of lists in response to the gathered packet stream data.

5. A method for optimizing the operation of a transport stream encoder producing a stream of packets carrying data representing a plurality of component signals comprising the steps of:

partitioning the packet stream into successive groups containing a plurality of packet slots:

maintaining a plurality of lists, respectively associated with the plurality of packet slots, each list containing a plurality of entries, each entry containing data representing a respective one of the plurality of component signals;

generating the packet stream in response to the entries in the plurality of lists; and modifying the plurality of lists based on a predetermined parameter; wherein the predetermined parameter is the contents of the packet stream;

the method further comprises the step of collecting data concerning the packet stream;

the modifying step comprises the step of modifying the plurality of lists in response to the gathered packet stream data; and wherein each packet contains data identifying which of the plurality of component signals is carried in that packet; and the data gathering step comprises the steps of:

extracting the component signal identifying data from each generated packet; and constructing a histogram of the extracted component signal identifying data over a predetermined period of time.

6. A method for optimizing the operation of a transport stream encoder producing a stream of packets carrying data representing a plurality of component signals, comprising the steps of:

partitioning the packet stream into successive groups containing a plurality of packet slots;

maintaining a plurality of lists, respectively associated with the plurality of packet slots, each list containing a plurality of entries, each entry containing data representing a respective one of the plurality of component signals;

generating the packet stream in response to the entries in the plurality of lists; and modifying the plurality of lists based on a predetermined parameter; wherein the step of maintaining the predetermined number of lists comprises the step of maintaining a first set and a second set of lists; and the transport stream encoder operates in a first mode of operation in which:

the step of generating the packet stream comprises the step of generating the packet stream in response to the first set of lists; and the step of modifying the plurality of lists comprises the step of modifying the second set of priority lists; and in a second mode of operation in which:

the step of generating the packet stream comprises the step of generating the packet stream in response to the second set of lists; and the step of modifying the plurality of priority lists comprises the step of modifying the first set of lists.

7. A transport stream encoder, comprising:

a plurality of component signal sources;

a packet generator, coupled to the plurality of component signal sources, for producing a composite packet stream, partitioned into successive groups containing a plurality of packet slots;

a memory, storing a plurality of lists respectively associated with the plurality of packet slots, each list containing a plurality of entries, each entry containing data representing a respective one of the plurality of component signal sources;

a scheduler, responsive to the entries in the plurality of lists, for conditioning the packet generator to generate a packet for each one of the packet slots, the packet containing data from a component signal source selected from among the component signal sources having representative data in the entries in the list associated with the one of the packet slots; and a processor, for modifying the entries in the plurality of lists in response to a predetermined parameter.

8. The encoder of claim 7:

further comprising a clock; and the processor is responsive to the clock for modifying the entries in the plurality of lists in response to a prescheduled change in the component signal sources.

9. The encoder of claim 7:

further comprising a data collector, responsive to the composite packet stream, for gathering data concerning the composite packet stream; and wherein:

the processor modifies the entries in the plurality of lists in response to the gathered composite packet stream data.

10. A transport stream decoder, comprising:

a plurality of component signal sources;

a packet generator, coupled to the plurality of component signal sources, for producing a composite packet stream, partitioned into successive groups containing a plurality of packet slots;

a memory, storing a plurality of lists respectively associated with the plurality of packet slots, each list containing a plurality of entries, each entry containing data representing a respective one of the plurality of component signal sources;

a scheduler, responsive to the entries in the plurality of lists, for conditioning the packet generator to generate a packet for each one of the packet slots, the packet containing data from a component signal source selected from among the component signal sources having representative data in the entries in the list associated with the one of the packet slots;

a processor, for modifying the entries in the plurality of lists in response to a predetermined parameter;

a data collector, responsive to the composite packet stream, for gathering data concerning the composite packet stream; wherein the processor modifies the entries in the plurality of lists in response to the gathered composite packet stream data; and wherein the packet generator includes circuitry to include data identifying which of the plurality of component signals is carried in each packet; and the data collector includes circuitry for:
   extracting the component signal identifying data from each generated packet; and
   constructing a histogram of the extracted component signal identifying data over a predetermined period of time.

11. The encoder of claim 7 wherein the memory stores a plurality of priority lists respectively associated with the plurality of packet slots.

12. A transport stream encoder, comprising:

a plurality of component signal sources;

a packet generator, coupled to the plurality of component signal sources, for producing a composite packet stream, partitioned into successive groups containing a plurality of packet slots;

a memory, storing a plurality of lists respectively associated with the plurality of packet slots, each list containing a plurality of entries, each entry containing data representing a respective one of the plurality of component signal sources;

a scheduler, responsive to the entries in the plurality of lists, for conditioning the packet generator to generate a packet for each one of the packet slots, the packet containing data from a component signal source selected from among the component signal sources having representative data in the entries in the list associated with the one of the packet slots; and a processor, for modifying the entries in the plurality of lists in response to a predetermined parameter, wherein the memory contains a first area containing a first set of priority lists, and a second area containing a second set of priority lists; and the encoder operates in a first mode of operation in which:
   the scheduler conditions the packet generator to generate a packet for each packet slot in response to the first set of priority lists; and
   the processor modifies the entries in the second set of priority lists in response to the packet data stream; and operates in a second mode of operation in which:
   the scheduler conditions the packet generator to generate a packet for each packet slot in response to the second set of priority lists; and
   the processor modifies the entries in the first set of priority lists in response to the packet data stream.

13. The encoder of claim 7 wherein the memory is a FIFO memory.

14. The encoder of claim 7 wherein the memory is a read/write (RAM) memory.

* * * * *